(12) United States Patent
Gao

(10) Patent No.: US 10,769,802 B2
(45) Date of Patent: Sep. 8, 2020

(54) INDOOR DISTANCE MEASUREMENT METHOD

(71) Applicant: GoerTek Technology Co., Ltd., Qingdao (CN)

(72) Inventor: Fengkai Gao, Qingdao (CN)

(73) Assignee: GoerTek Technology Co., Ltd., Qingdao (CN)

(*) Notice: Subject to any disclaimer, the term of this patent is extended or adjusted under 35 U.S.C. 154(b) by 0 days.

(21) Appl. No.: 16/080,698

(22) PCT Filed: Dec. 31, 2016

(86) PCT No.: PCT/CN2016/114055
§ 371 (c)(1),
(2) Date: Jan. 28, 2019

(87) PCT Pub. No.: WO2017/215250
PCT Pub. Date: Dec. 21, 2017

(65) Prior Publication Data
US 2019/0164305 A1 May 30, 2019

(30) Foreign Application Priority Data

Jun. 13, 2016 (CN) .......................... 2016 1 0411893

(51) Int. Cl.
*G06T 7/00* (2017.01)
*G06T 7/50* (2017.01)
(Continued)

(52) U.S. Cl.
CPC .................. *G06T 7/50* (2017.01); *G01B 7/02* (2013.01); *G01B 11/02* (2013.01); *G01B 11/022* (2013.01);
(Continued)

(58) Field of Classification Search
None
See application file for complete search history.

(56) References Cited

U.S. PATENT DOCUMENTS 9,303,982 B1  4/2016  Ivanchenko et al.
2010/0208057 A1* 8/2010  Meier .................. G06T 19/006
                                          348/135
(Continued)

FOREIGN PATENT DOCUMENTS

CN      103115596 A     5/2013
CN      103759701 A     4/2014
(Continued)

OTHER PUBLICATIONS

International Bureau of WIPO, International Search Report and Written Opinion in Application No. PCT/CN2016/114055 dated Mar. 23, 2017.
(Continued)

*Primary Examiner* — Delomia L Gilliard
(74) *Attorney, Agent, or Firm* — LK Global | Lorenz & Kopf, LLP

(57) ABSTRACT

An indoor distance measurement method includes, but is not limited to acquiring a horizontal distance between a camera on an Augmented Reality (AR) device and a target object and a height of the target object by using a direction sensor provided on an AR device. The method further includes, but is not limited to, superimposing and displaying the horizontal distance and the height of the target object on a real-world scene displayed by the AR device.

9 Claims, 2 Drawing Sheets

(51) Int. Cl.
*G01B 21/02* (2006.01)
*G01B 11/02* (2006.01)
*G01B 7/02* (2006.01)

(52) U.S. Cl.
CPC ............ *G01B 11/026* (2013.01); *G01B 21/02* (2013.01); *G06T 2207/10016* (2013.01); *G06T 2207/10028* (2013.01)

(56) References Cited

U.S. PATENT DOCUMENTS

| | | | |
|---|---|---|---|
| 2013/0141419 A1* | 6/2013 | Mount | G06F 3/011 345/419 |
| 2013/0194259 A1* | 8/2013 | Bennett | G06T 19/006 345/420 |
| 2017/0011210 A1* | 1/2017 | Cheong | A61B 5/0022 |
| 2017/0256073 A1* | 9/2017 | Borenstein | H04N 5/23219 |

FOREIGN PATENT DOCUMENTS

| | | | | |
|---|---|---|---|---|
| CN | 104374365 | A | | 2/2015 |
| CN | 104748728 | A | | 7/2015 |
| CN | 104748739 | A | | 7/2015 |
| CN | 105043315 | A | | 11/2015 |
| CN | 105444763 | A | | 3/2016 |
| CN | 105571561 | A | | 5/2016 |
| CN | 105937878 | A | | 9/2016 |
| CN | 106126964 | A | | 11/2016 |
| JP | 2015035808 | A | | 2/2015 |
| KR | 20130022831 | A | * | 3/2013 ............... G01C 3/10 |
| WO | 2007114327 | A1 | | 10/2007 |
| WO | 2015048906 | A1 | | 4/2015 |
| WO | WO-2015048906 | A1 | * | 4/2015 ......... G02B 27/0172 |

OTHER PUBLICATIONS

Office Action of Chinese Patent Office, CN Patent Application No. 201610411893.8 dated Jan. 26, 2018.

* cited by examiner

INDOOR DISTANCE MEASUREMENT METHOD

CROSS REFERENCE TO RELATED APPLICATIONS

This application is a U.S. National Stage entry under 35 U.S.C. § 371 based on International Application No. PCT/CN2016/114055, filed on Dec. 31, 2016, which was published under PCT Article 21(2) and which claims priority to Chinese Patent Application No. 201610411893.8, filed on Jun. 13, 2016. The disclosure of the priority applications are hereby incorporated herein in their entirety by reference.

TECHNICAL FIELD

The present disclosure relates to the technical field of augmented reality, and more specifically to an indoor distance measurement method.

BACKGROUND

Augmented Reality (AR) is a technique integrating a real environment with virtual auxiliary information of objects through a computer to enhance the user's understanding and experience of the real world. Virtual information is applied to the real world, and computer-generated virtual objects, scenes, or system prompts are superimposed with real world scenarios to enhance the reality. In visualized augmented reality, the user overlays the real world with computer graphics into a multilayer by using a helmet display to see the real world around it.

When the AR device is used outdoors, the position coordinates can be acquired by a GPS sensor, and the distance between the AR device position and the target position is calculated based on their coordinates. However, when it is used indoors, GPS sensors cannot be used for distance measurement indoors, since GPS cannot effectively perform positioning indoors, and the distance to be measured indoors is relatively small. In the prior art, laser rangefinders are often used to measure the indoor distance and the height of objects. However, laser rangefinders are expensive and not suitable for products which do not require high measurement accuracy and products which are relatively cheap. In addition, in the prior art there is also a method of acquiring the position and height information of a target object by graphic image processing, but this method needs a very large calculation amount and is not very accurate. In addition, other objects, desirable features and characteristics will become apparent from the subsequent summary and detailed description, and the appended claims, taken in conjunction with the accompanying drawings and this background.

SUMMARY

In view of the above problems, the present disclosure provides an indoor distance measurement method to solve the problems of the prior art that the cost is high, the calculation amount is large and the accuracy is not high when the augmented reality device measures the distance between the target object and itself and the height of the target object.

To achieve the above object, the technical solutions of the present disclosure are as follows.

An indoor distance measurement method comprising:

acquiring a horizontal distance between a camera on an augmented reality device and a target object by using a direction sensor provided on the augmented reality device;

acquiring a height of the target object according to the horizontal distance between the camera and the target object by using the direction sensor provided on the augmented reality device; and superimposing and displaying the horizontal distance and the height of the target object on a real-world scene displayed by the augmented reality device.

In some embodiments, the step of acquiring a horizontal distance between a camera on an augmented reality device and a target object by using a direction sensor provided on the augmented reality device comprises:

acquiring, by using the direction sensor, an included angle $\alpha$ of a connecting line between the camera on the augmented reality device and an intersection of the bottom of the target object and the ground with respect to a direction perpendicular to the ground, or an included angle $\alpha$ of a connecting line between the camera and an intersection of an extension line of the target object and the ground with respect to a direction perpendicular to the ground;

acquiring a vertical distance $h_1$ between the camera and the ground; and acquiring the horizontal distance L between the camera and the target object by calculating based on the included angle $\alpha$ and the vertical distance $h_1$ by using the formula $L = h_1 \times \tan \alpha$.

In some embodiments, the step of acquiring a vertical distance $h_1$ between the camera and the ground comprises:

defining the vertical distance $h_1$ between the camera and the ground by subtracting a preset value from a body height value inputted by a user.

In some embodiments, before acquiring the included angle by using the direction sensor, a reference value of the direction sensor is acquired by using the following steps:

when the camera is disposed perpendicular to the ground, disposed parallel to the ground and upward, or disposed parallel to the ground and downward, the theoretical angle values acquired by the direction sensor should be 0°, 90° or 270° respectively, and the reference value is defined as a difference between the angle value actually acquired by the direction sensor and the theoretical angle value; and the angle of the connecting line between the camera and the target object acquired by the direction sensor is the actual angle value acquired by the direction sensor minus the reference value.

In some embodiments, with respect to a target object whose height is less than the camera and whose bottom is in contact with the ground, the step of acquiring a height of the target object according to the horizontal distance between the camera and the target object by using the direction sensor provided on the augmented reality device comprises:

acquiring an included angle $\beta_1$ of a connecting line between the camera and a top of the target object with respect to a direction perpendicular to the ground by using the direction sensor;

acquiring a vertical distance $h_2$ between the camera and the top of the target object by calculating based on the included angle $\beta_1$ and the acquired horizontal distance L by using the formula $h_2 = L / \tan \beta_1$; and acquiring the height h of the target object by using the formula $h = h_1 - h_2$, wherein $h_1$ is the vertical distance between the camera and the ground.

In some embodiments, with respect to a target object whose height is greater than the camera and whose bottom is in contact with the ground, the step of acquiring a height of the target object according to the horizontal distance between the camera and the target object by using the direction sensor provided on the augmented reality device comprises:

acquiring an included angle β2 of a connecting line between the camera and a top of the target object with respect to a direction perpendicular to the ground by using the direction sensor; and acquiring a height h' of the target object by calculating based on the included angle β2, the acquired included angle α and the horizontal distance L by using the formula h'=tan(β2-90°)×L+tan(90-α)×L.

In some embodiments, with respect to a target object whose bottom is not in contact with the ground, the step of acquiring a height of the target object according to the horizontal distance between the camera and the target object by using the direction sensor provided on the augmented reality device comprises:

acquiring an included angle β3 of a connecting line between the camera and a top of the target object with respect to a direction perpendicular to the ground by using the direction sensor;

acquiring an included angle β4 of a connecting line between the camera and a bottom of the target object with respect to a direction perpendicular to the ground by using the direction sensor; and acquiring a height h" of the target object by calculating based on the included angle β3, the included angle β4 and the acquired horizontal distance L by using the formula h"=tan(β3−90°)×L+tan(90°−β4)×L.

In some embodiments, before the step of acquiring a height of the target object according to the horizontal distance between the camera and the target object by using the direction sensor provided on the augmented reality device, the method further comprises:

selecting an intersection of the bottom of the target object and the ground or an intersection of the extension line of the target object and the ground, selecting a point at the top of the target object, and selecting a point at the bottom of the target object; and marking these selected points respectively by directing the camera to these selected points for a period of time exceeding a preset time.

In some embodiments, the method further comprises: providing mode matching selection keys on the augmented reality device to match with the following three measurement modes respectively: measuring the horizontal distance between the camera and the target object, measuring the height of a target object whose bottom is in contact with the ground, and measuring the height of a target object whose bottom is not in contact with the ground.

In some embodiments, the method further comprises: according to whether the number of the selected points marked by the user is one, two or three, automatically matching by the augmented reality device the following three measurement modes: measuring the horizontal distance between the camera and the target object, measuring the height of a target object whose bottom is in contact with the ground, and measuring the height of a target object whose bottom is not in contact with the ground.

The advantageous effects of the present disclosure are as follows. The indoor distance measurement method provided by the present disclosure, by only acquiring an included angle of the connecting line between the camera and the intersection of the bottom of the target object and the ground with respect to the direction perpendicular to the ground or an included angle of the connecting line between the camera and the intersection between the extension line of the target object and the ground with respect to the direction perpendicular to the ground, an included angle of the connecting line between the camera and the top of the target object with respect to the direction perpendicular to the ground, and an included angle of the connecting line between the camera and the bottom of the target object with respect to the direction perpendicular to the ground, and then further based on the vertical distance between the camera and the ground, calculates the horizontal distance between the camera and the target object and the height of the target object by using the Pythagorean theorem. Therefore, the calculation method is simple and quick, the calculation amount is small, and the cost is low.

BRIEF DESCRIPTION OF DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the Application and uses of the invention. Furthermore, there is no intention to be bound by any theory presented in the preceding background of the invention or the following detailed description.

In order to make the objectives, technical solutions and advantages of the present disclosure clearer, the present disclosure is further described in detail with reference to the accompanying drawings.

Figure 1:
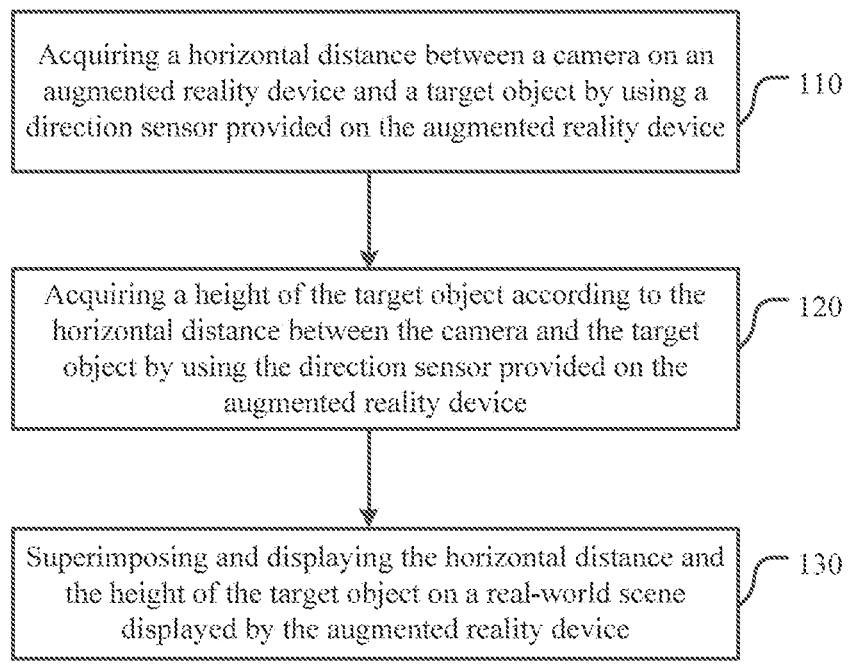
FIG. 1 is a flowchart of an indoor distance measurement method according to an embodiment of the present disclosure.

As shown in FIG. 1, the present disclosure provides an indoor distance measurement method comprising:

Step S110: acquiring a horizontal distance between a camera on an augmented reality device and a target object by using a direction sensor provided on the augmented reality device;

Step S120: acquiring a height of the target object according to the horizontal distance between the camera and the target object by using the direction sensor provided on the augmented reality device; and Step S130: superimposing and displaying the horizontal distance and the height of the target object on a real-world scene displayed by the augmented reality device.

In a preferred embodiment of the present disclosure, before acquiring the included angle by using the direction sensor, a reference value of the direction sensor is acquired by using the following steps:

When the camera is disposed perpendicular to the ground, disposed parallel to the ground and upward, or disposed parallel to the ground and downward, the theoretical angle values acquired by the direction sensor should be 0°, 90° or 270° respectively, and the reference value is defined as a difference between the angle value actually acquired by the direction sensor and the theoretical angle value, so the angle of the connecting line between the camera and the target object acquired by the direction sensor is the actual angle value acquired by the direction sensor minus the reference value. For example, when the camera is disposed perpendicular to the ground, the included angle of a ray emitted from the camera acquired by the direction sensor with respect to the direction perpendicular to the ground is 5°, and since the theoretical angle value of the ray emitted from the camera with respect to the direction perpendicular to the ground should be 0°, the reference value will be defined as 5°. When the included angle of the connecting line between the camera and the target object is acquired by the direction sensor afterwards, the angle value actually acquired by the direction sensor should be subtracted by the reference value 5° in order to improve the measurement accuracy of the direction sensor.

Figure 2:
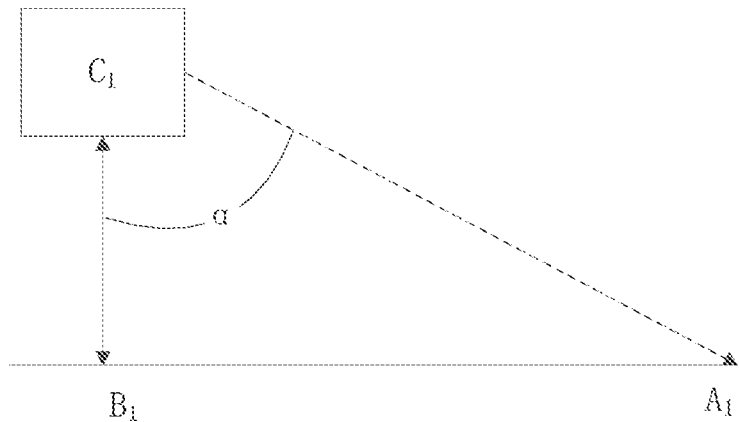
FIG. 2 is a schematic diagram of acquiring the horizontal distance between a camera and a target object by using an augmented reality device according to an embodiment of the present disclosure.

As shown in FIG. 2, the step 120 of acquiring a horizontal distance between a camera on an augmented reality device and a target object by using a direction sensor provided on the augmented reality device comprises:

Acquiring, by using the direction sensor, an included angle $\alpha$ of the connecting line between the camera (i.e., the point C in FIG. 2) and the intersection of the bottom of the target object and the ground with respect to the direction perpendicular to the ground, or an included angle $\alpha$ of the connecting line between the camera and the intersection between the extension line of the target object and the ground with respect to the direction perpendicular to the ground;

acquiring a vertical distance h1 between the camera and the ground, that is, the distance of $B_1C_1$ in FIG. 2; and acquiring the horizontal distance L between the camera and the target object, that is, the distance of $B_1A_1$ in FIG. 2, by calculating based on the included angle $\alpha$ and the vertical distance h1 by using the formula L=h1×tan $\alpha$.

In a specific embodiment of the present disclosure, the step of acquiring a vertical distance h1 between the camera and the ground comprises: defining the vertical distance h1 between the camera and the ground by subtracting a preset value from the body height value inputted by the user. Since when the user wears the AR device on the head, the AR device is lower than the user's forehead, the vertical distance between the AR device's camera and the ground is less than the user's body height value. Therefore, a preset value must be subtracted from the user's body height value to improve the accuracy, and the preset value may take an empirical value, such as 11 cm.

Figure 3:
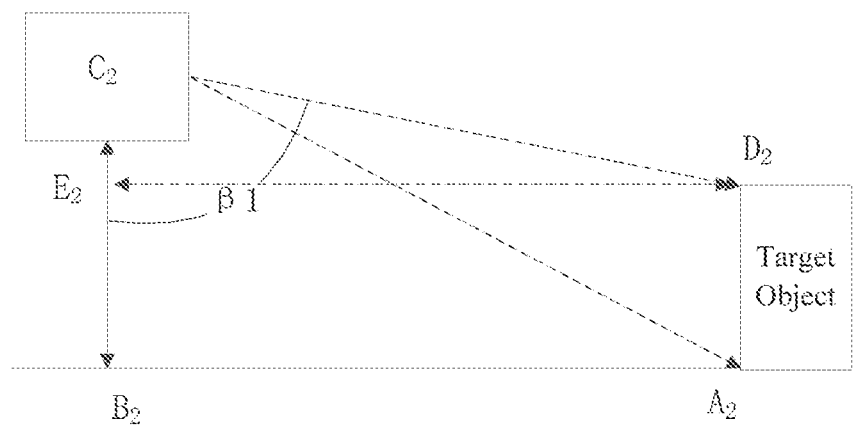
FIG. 3 is a schematic diagram of acquiring the height of a target object, whose height is less than the camera and whose bottom is in contact with the ground, by using an augmented reality device according to an embodiment of the present disclosure.

As shown in FIG. 3, with respect to a target object whose height is less than the camera and whose bottom is in contact with the ground, the intersection between the bottom of the target object and the ground is the point $A_2$, and the top of the target object is the point $D_2$. The step of acquiring a height of the target object according to the horizontal distance between the camera and the target object by using the direction sensor provided on the augmented reality device comprises:

acquiring an included angle $\beta 1$ of the connecting line $C_2D_2$ between the camera (the point $C_2$) and the top of the target object (the point $D_2$) with respect to the direction perpendicular to the ground $C_2B_2$ by using the direction sensor;

acquiring a vertical distance h2 between the camera and the top of the target object, that is, the distance of $C_2E_2$ in FIG. 3, by calculating based on the included angle $\beta 1$ and the horizontal distance L acquired as stated above, that is, the distance of $B_2A_2$ in FIG. 3, by using the formula h2=L/tan $\beta 1$, wherein $D_2E_2$ is perpendicular to $C_2B_2$; and acquiring the height h of the target object, that is, the distance of $A_2D_2$ in FIG. 3, by using the formula h=h1−h2, wherein h1 is the vertical distance between the camera and the ground.

Figure 4:
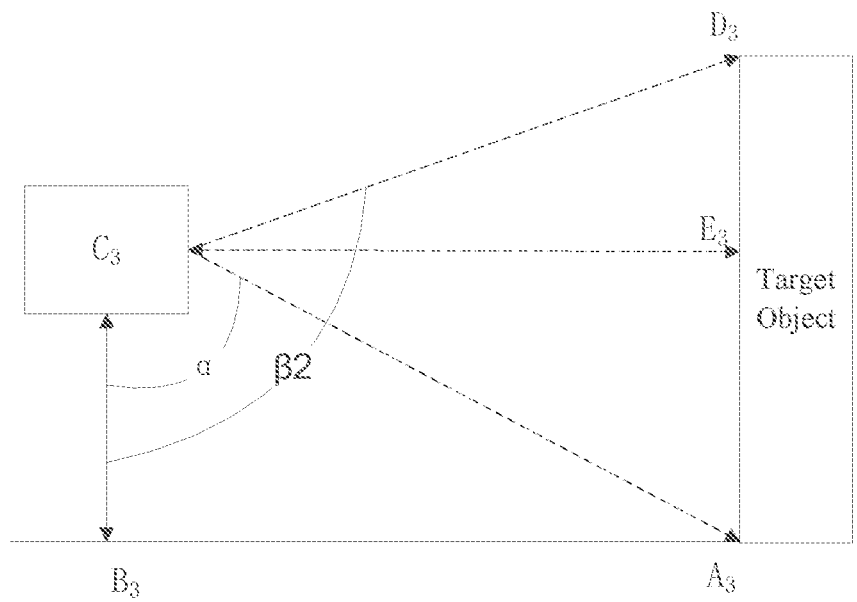
FIG. 4 is a schematic diagram of acquiring the height of a target object, whose height is greater than the camera and whose bottom is in contact with the ground, by using an augmented reality device according to an embodiment of the present disclosure.

As shown in FIG. 4, with respect to a target object whose height is greater than the camera and whose bottom is in contact with the ground, the intersection between the bottom of the target object and the ground is the point $A_3$, and the top of the target object is the point $D_3$. The step of acquiring a height of the target object by using the direction sensor provided on the augmented reality device comprises:

acquiring an included angle $\beta 2$ of the connecting line $C_3D_3$ between the camera (the point $C_3$) and the top of the target object (the point $D_3$) with respect to the direction perpendicular to the ground $C_3B_3$ by using the direction sensor; and acquiring the height h' of the target object by calculating based on the included angle $\beta 2$, the acquired included angle $\alpha$ and the horizontal distance L by using the formula h'=tan($\beta 2$−90°)×L+tan(90°−$\alpha$)×L, wherein $\alpha$ is the included angle between $C_3B_3$ and $C_3A_3$ and may be acquired directly by the sensor, and L is the distance of $B_3A_3$ and may be calculated by using the formula $B_3A_3$=h1×tan $\alpha$. If a perpendicular line $C_3E_3$ is drawn from the point C to the point $A_3D_3$, tan($\beta 2$−90°)×L is the distance of $D_3E_3$, and tan(90°−$\alpha$)×L is the distance of $A_3E_3$.

Figure 5:
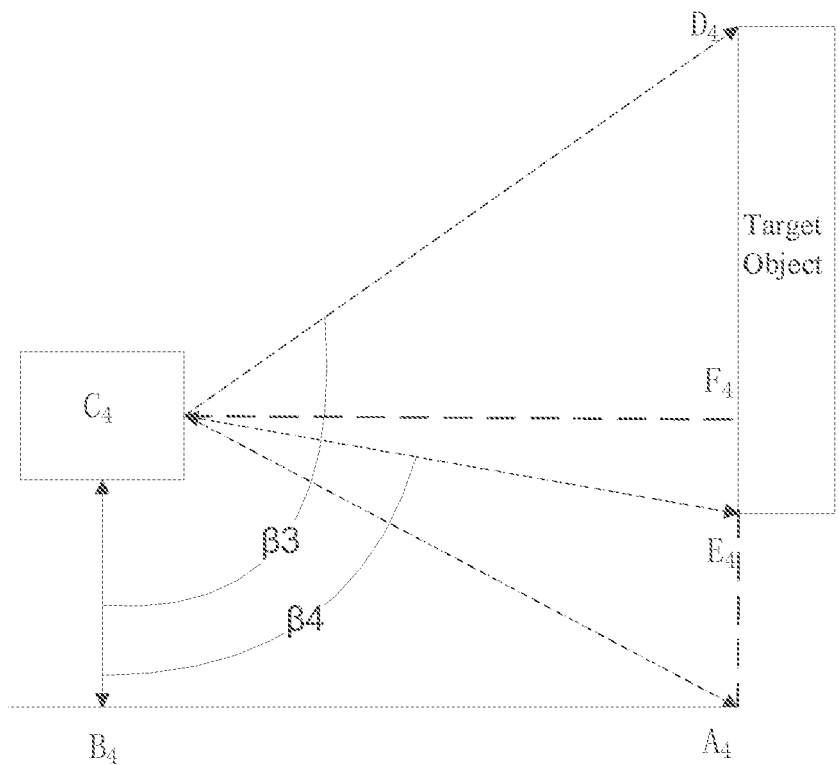
FIG. 5 is a schematic diagram of acquiring the height of a target object, whose bottom is not in contact with the ground, by using an augmented reality device according to an embodiment of the present disclosure.

As shown in FIG. 5, with respect to a target object whose bottom is not in contact with the ground, the intersection between the extension line of the target object and the ground is the point $A_4$, and the top of the target object is the point $D_4$. The step of acquiring a height of the target object by using the direction sensor provided on the augmented reality device comprises:

acquiring an included angle $\beta 3$ of the connecting line $C_4D_4$ between the camera and the top of the target object with respect to the direction perpendicular to the ground $C_4B_4$ by using the direction sensor;

acquiring an included angle $\beta 4$ of the connecting line $C_4E_4$ between the camera and the bottom of the target object with respect to the direction perpendicular to the ground $C_4B_4$ by using the direction sensor; and acquiring the height h" of the target object by calculating based on the included angle $\beta 3$, the included angle $\beta 4$ and the acquired horizontal distance L by using the formula h"=tan($\beta 3$−90°)×L+tan(90°−$\beta 4$)×L, wherein L is the distance of $B_4A_4$ and may be calculated by using the formula $B_4A_4$=$B_4C_4$×tan $\alpha$, and $\alpha$ is the included angle between $C_4B_4$ and $C_4A_4$ and may be acquired directly by the sensor. If a perpendicular line $C_4F_4$ is drawn from the point C to the point $E_4D_4$, tan($\beta 3$−90°)×L is the distance of $D_4F_4$, and tan(90°−$\beta 4$)×L is the distance of $F_4E_4$.

It should be noted that, the bottom of the target object being not in contact with the ground comprises two types of situations. One is that the intersection between the extension line of the target object and the ground can be directly seen. For example, if the target object is a window, the intersection of the extension line of the window and the ground can be determined by the intersection of the wall under the window and the ground. The other situation is that the target object is suspended, the intersection between the extension line of the target object and the ground cannot be directly seen, and the intersection must be determined by other methods. For example, a string with a weight at its end may be suspended at the bottom of the target object, and the point on the ground that the weight is in contact with is determined as the intersection between the extension line of the target object and the ground.

In a specific embodiment of the present disclosure, before the step of acquiring a height of the target object according to the horizontal distance between the camera and the target object by using the direction sensor provided on the augmented reality device, it is necessary to select a point at the top of the target object, select a point at the bottom of the target object, and select the intersection of the bottom of the target object and the ground or the intersection between the extension line of the target object and the ground. These selected points may be marked in the following two ways. One is to mark these selected points respectively by directing the camera to the selected points for a period of time exceeding a preset time. That is, after the camera is aimed at these selected points for a preset time, for example, 3 seconds, the camera can acquire the selected points. The other way is that, the selected points can be acquired by directing the camera to the selected points and then clicking the confirm box or key on the input device provided with the AR device, such as a Bluetooth keyboard.

In a preferred embodiment of the present disclosure, the method further comprises: according to whether the number of the selected points marked by the user is one, two or three, automatically matching by the augmented reality device the following three measurement modes: measuring the horizontal distance between the camera and the target object, measuring the height of a target object whose bottom is in contact with the ground, and measuring the height of a target object whose bottom is not in contact with the ground. That is, when the user marks one selected point, the AR device automatically matches with measuring the horizontal distance between the camera and the target object, and the selected point marked is the intersection of the bottom of the target object and the ground, or the intersection between the extension line of the target object and the ground. When the user marks two selected points, the AR device automatically matches with measuring the height of a target object whose bottom is in contact with the ground, and the two selected points are the intersection of the bottom of the target object and the ground, and a point at the top of the target object. When the user marks three selected points, the AR device automatically matches with measuring the height of a target object whose bottom is not in contact with the ground, and the three selected points are the intersection between the extension line of the target object and the ground, a point at the bottom of the target object, and a point at the top of the target object.

In another preferred embodiment of the present disclosure, the method further comprises: providing mode matching selection keys on the augmented reality device to match with the following three measurement modes respectively: measuring the horizontal distance between the camera and the target object, measuring the height of a target object whose bottom is in contact with the ground, and measuring the height of a target object whose bottom is not in contact with the ground. When the user presses different selection keys, the AR device enters different measurement modes.

In summary, the advantageous effects of the embodiments of the present disclosure are as follows. The indoor distance measurement method provided by the present disclosure, by only acquiring an included angle of the connecting line between the camera and the intersection of the bottom of the target object and the ground with respect to the direction perpendicular to the ground or an included angle of the connecting line between the camera and the intersection between the extension line of the target object and the ground with respect to the direction perpendicular to the ground, an included angle of the connecting line between the camera and the top of the target object with respect to the direction perpendicular to the ground, and an included angle of the connecting line between the camera and the bottom of the target object with respect to the direction perpendicular to the ground, and then further based on the vertical distance between the camera and the ground, calculates the horizontal distance between the camera and the target object and the height of the target object by using the Pythagorean theorem. Therefore, the calculation method is simple and quick, the calculation amount is small, and the cost is low.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An indoor distance measurement method comprising:
acquiring a horizontal distance between a camera on an augmented reality device and a target object by using a direction sensor provided on the augmented reality device;
acquiring a height of the target object according to the horizontal distance between the camera and the target object by using the direction sensor provided on the augmented reality device; and
superimposing and displaying the horizontal distance and the height of the target object on a real-world scene displayed by the augmented reality device;
wherein before the step of acquiring a height of the target object according to the horizontal distance between the camera and the target object by using the direction sensor provided on the augmented reality device, the method further comprises:
selecting an intersection of the bottom of the target object and the ground or an intersection of the extension line of the target object and the ground, selecting a point at the top of the target object, and selecting a point at the bottom of the target object; and
marking these selected points respectively by directing the camera to these selected points for a period of time exceeding a preset time.

2. The method according to claim 1, wherein the step of acquiring the horizontal distance between the camera on an augmented reality device and a target object by using a direction sensor provided on the augmented reality device comprises:

acquiring, by using the direction sensor, an included angle $\alpha$ of a connecting line between the camera on the augmented reality device and an intersection of the bottom of the target object and the ground with respect to a direction perpendicular to the ground, or an included angle $\alpha$ of a connecting line between the camera and an intersection of an extension line of the target object and the ground with respect to a direction perpendicular to the ground;

acquiring a vertical distance h1 between the camera and the ground; and acquiring the horizontal distance L between the camera and the target object by calculating based on the included angle $\alpha$ and the vertical distance h1 by using the formula L=h1×tan $\alpha$.

3. The method according to claim 2, wherein the step of acquiring the vertical distance h1 between the camera and the ground comprises:

defining the vertical distance h1 between the camera and the ground by subtracting a preset value from a body height value inputted by a user.

4. The method according to claim 3, wherein before acquiring the included angle by using the direction sensor, a reference value of the direction sensor is acquired by using the following steps:

when the camera is disposed perpendicular to the ground, disposed parallel to the ground and upward, or disposed parallel to the ground and downward, the theoretical angle values acquired by the direction sensor should be 0°, 90° or 270° respectively, and the reference value is defined as a difference between the angle value actually acquired by the direction sensor and the theoretical angle value; and the angle of the connecting line between the camera and the target object acquired by the direction sensor is the actual angle value acquired by the direction sensor minus the reference value.

5. The method according to claim 2, wherein with respect to the target object whose height is less than the camera and whose bottom is in contact with the ground, the step of acquiring a height of the target object according to the horizontal distance between the camera and the target object by using the direction sensor provided on the augmented reality device comprises:

acquiring an included angle $\beta 1$ of a connecting line between the camera and a top of the target object with respect to a direction perpendicular to the ground by using the direction sensor;

acquiring a vertical distance h2 between the camera and the top of the target object by calculating based on the included angle $\beta 1$ and the acquired horizontal distance L by using the formula h2=L/tan $\beta 1$; and acquiring the height h of the target object by using the formula h=h1−h2, wherein h1 is the vertical distance between the camera and the ground.

6. The method according to claim 2, wherein with respect to the target object whose height is greater than the camera and whose bottom is in contact with the ground, the step of acquiring a height of the target object according to the horizontal distance between the camera and the target object by using the direction sensor provided on the augmented reality device comprises:

acquiring an included angle $\beta 2$ of a connecting line between the camera and a top of the target object with respect to a direction perpendicular to the ground by using the direction sensor; and acquiring a height h' of the target object by calculating based on the included angle $\beta 2$, the acquired included angle $\alpha$ and the horizontal distance L by using the formula h'=tan($\beta 2$−90°)×L+tan(90°−$\alpha$)×L.

7. The method according to claim 2, wherein with respect to the target object whose bottom is not in contact with the ground, the step of acquiring a height of the target object according to the horizontal distance between the camera and the target object by using the direction sensor provided on the augmented reality device comprises:

acquiring an included angle $\beta 3$ of a connecting line between the camera and a top of the target object with respect to a direction perpendicular to the ground by using the direction sensor;

acquiring an included angle $\beta 4$ of a connecting line between the camera and a bottom of the target object with respect to a direction perpendicular to the ground by using the direction sensor; and acquiring a height h" of the target object by calculating based on the included angle $\beta 3$, the included angle $\beta 4$ and the acquired horizontal distance L by using the formula h"=tan($\beta 3$−90°)×L+tan(90°−$\beta 4$)×L.

8. The method according to claim 1, further comprising:

providing mode matching selection keys on the augmented reality device to match with the following three measurement modes respectively: measuring the horizontal distance between the camera and the target object, measuring the height of a target object whose bottom is in contact with the ground, and measuring the height of a target object whose bottom is not in contact with the ground.

9. The method according to claim 1, further comprising:

according to whether the number of the selected points marked by the user is one, two or three, automatically matching by the augmented reality device the following three measurement modes: measuring the horizontal distance between the camera and the target object, measuring the height of a target object whose bottom is in contact with the ground, and measuring the height of a target object whose bottom is not in contact with the ground.

* * * * *